(12) United States Patent
Myhre et al.

(10) Patent No.: US 10,999,743 B2
(45) Date of Patent: May 4, 2021

(54) UE CONTEXT HANDLING IN DISAGGREGATED RADIO ACCESS NODE

(71) Applicant: Telefonaktiebolaget LM Ericsson (publ), Stockholm (SE)

(72) Inventors: Elena Myhre, Järfälla (SE); Walter Müller, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/619,517

(22) PCT Filed: Jun. 18, 2018

(86) PCT No.: PCT/EP2018/066121
§ 371 (c)(1),
(2) Date: Dec. 5, 2019

(87) PCT Pub. No.: WO2018/229299
PCT Pub. Date: Dec. 20, 2018

(65) Prior Publication Data
US 2020/0092733 A1  Mar. 19, 2020

Related U.S. Application Data

(60) Provisional application No. 62/521,336, filed on Jun. 16, 2017.

(51) Int. Cl.
*H04L 1/00* (2006.01)
*H04W 16/18* (2009.01)
(Continued)

(52) U.S. Cl.
CPC .......... *H04W 16/18* (2013.01); *H04W 24/02* (2013.01); *H04W 28/08* (2013.01);
(Continued)

(58) Field of Classification Search
CPC ... H04W 16/18; H04W 88/085; H04W 24/02; H04W 36/22; H04W 36/0083; H04W 36/32; H04W 28/08; H04W 48/18
(Continued)

(56) References Cited

U.S. PATENT DOCUMENTS 8,150,411 B2    4/2012  Fischer
9,906,994 B2    2/2018  He et al.
(Continued)

FOREIGN PATENT DOCUMENTS

CN    105517085 A    4/2016
RU      2420883 C2    6/2011
(Continued)

OTHER PUBLICATIONS

3GPP TSG-RAN WG3 #96, CATT, Discussion on UE Context Management, Hangzhou, P. R. China, May 15-19, 2017, R3-171458.
(Continued)

*Primary Examiner* — Huy C Ho
(74) *Attorney, Agent, or Firm* — Coats & Bennett, PLLC

(57) ABSTRACT

The invention refers to a method performed by a radio network node (200), wherein the radio access network comprises a central unit, CU (220), and a distributed unit, DU (210), comprising obtaining (502) one or more criteria for determining a preferable location for a UE context controller in the radio access network node, the UE context controller managing a connection between a UE (100) and the radio access network node (200); and determining (504), based on the one or more criteria, whether the UE context controller shall be located in the CU (220) and/or in the DU (210). The invention further related to a corresponding radio network node (200).

16 Claims, 12 Drawing Sheets

(51) Int. Cl.

| | | |
|---|---|---|
| *H04W 24/02* | (2009.01) | |
| *H04W 28/08* | (2009.01) | |
| *H04W 36/00* | (2009.01) | |
| *H04W 36/22* | (2009.01) | |
| *H04W 36/32* | (2009.01) | |
| *H04W 48/18* | (2009.01) | |
| *H04W 88/08* | (2009.01) | |

(52) U.S. Cl.
CPC ....... *H04W 36/0083* (2013.01); *H04W 36/22* (2013.01); *H04W 36/32* (2013.01); *H04W 48/18* (2013.01); *H04W 88/085* (2013.01)

(58) Field of Classification Search
USPC .......................................................... 370/236
See application file for complete search history.

(56) References Cited

U.S. PATENT DOCUMENTS

| | | | |
|---|---|---|---|
| 2015/0133122 A1 | 5/2015 | Chen | |
| 2017/0026887 A1 | 1/2017 | Sirotkin et al. | |
| 2019/0313296 A1* | 10/2019 | Yiu | H04W 36/38 |
| 2020/0037146 A1* | 1/2020 | Salkintzis | H04W 12/06 |
| 2020/0260410 A1* | 8/2020 | Byun | H04W 88/16 |

FOREIGN PATENT DOCUMENTS

| | | |
|---|---|---|
| RU | 2602981 C2 | 11/2016 |
| WO | 2014177090 A1 | 11/2014 |
| WO | 2017045645 A1 | 3/2017 |

OTHER PUBLICATIONS

Ericsson , "Separation of CP and UP", 3GPP TSG RAN Meeting #76, West Palm Beach, US, Jun. 5, 2017, pp. 1-2, RP-171215, 3GPP.

Ericsson, "OAM for the CU-DU Deployment", 3GPP TSG-RAN WG3 #96, Hangzhou, CN, May 15, 2017, pp. 1-3, R3-171730, 3GPP.

Ericsson, "On the Functional Distribution Over the F1 Interface", 3GPP TSG-RAN WG3 #96, Hangzhou, CN, May 15, 2017, pp. 1-10, R3-171727, 3GPP.

3rd Generation Partnership Project, "3rd Generation Partnership Project; Technical Specification Group Radio Access Network; Study on New Radio Access Technology: Radio Access Architecture and Interfaces (Release 14)", Technical Report, 3GPP TR 38.801 v14.0.0, Mar. 1, 2017, pp. 1-91, 3GPP.

3rd Generation Partnership Project, "3rd Generation Partnership Project; Technical Specification Group Radio Access Network; Evolved Universal Terrestrial Radio Access Network (E-UTRAN); Architecture Description (Release 15)", Technical Specification, 3GPP TS 36.401 V15.1.0, Dec. 1, 2018, pp. 1-21, 3GPP.

CMCC, Further considerations on the CU/DU relationship, 3GPP TSG RAN WG3 Meeting #96, R3-17667.

\* cited by examiner

UE CONTEXT HANDLING IN DISAGGREGATED RADIO ACCESS NODE

TECHNICAL FIELD

The present disclosure generally relates to wireless communication systems, and specifically relates to handling a user equipment (UE) context in a disaggregated radio access node within a wireless communication system.

BACKGROUND

The 3GPP is working on a New Radio (NR) standard for 5G, building on LTE/EUTRAN standards.

As e.g. described in 3GPP TS 36.401 (current version 15.1.0), there are several types of UE associations needed in the access node (e.g. eNB or gNB); the so-called (eNB) UE context stores all information needed for a handling of the user equipment, UE.

The UE context may be regarded as a block of information associated to one UE. The block of information contains the necessary information required to maintain the radio access network, RAN, services towards the active UE. The UE context may comprise UE state information, security information, UE capability information and identities of the UE-associated logical S1 connection. A UE context is e.g. established when the transition to active state for a UE is completed, or in a target access node after completion of handover resource allocation during handover preparation.

For radio access network systems employing a disaggregated radio access network node, e.g. NR radio access networks comprising radio access nodes being referred to as gNBs, it has been agreed that a new interface, called F1, is to be specified to enable an deployment of a disaggregated gNB, wherein the is split into a node called central unit, gNB-CU, or CU and another node called distributed unit, gNB-DU or DU on the logical (or functional) level.

The CU may include a subset of gNB functions like transfer of user data, mobility control and session management, whereas the DU may include another subset of the gNB functions that are not included in the CU.

By consequence of the split, the radio interface between the UE and the gNB (the Uu interface) is split into two legs, and the protocol layer functions are split into different components of the gNB.

FIG. 1 illustrates such a system employing a disaggregated gNB (radio access network node) deployment, wherein the gNB functions are distributed into a CU and into a DU. The CU may be further split into a control plane unit, CU-CP, and a user plane unit, CU-UP. There may be one or a plurality of DUs, wherein each of the DUs may be associated to one or a plurality of cells.

The functional distribution by way of example may be chosen such that Uu functionality (associated to the Uu interface) is distributed to the CU, and to the DU, such that the radio resource control, RRC, layer and packet data convergence protocol, PDCP, layer reside in the CU, while the radio link control, RLC layer, the media access control, MAC, layer and the physical, PHY, layer of the radio interface reside in the Done or the plurality of DUs.

The F1 interface that shall connect the CU and each of the DUs may be further specified with a separate control plane component (F1-C) and a user plane component (F1-U). Consequently, the CU may be further split into a control plane unit, CU-CP and into a user plane unit, CU-UP. The PDCP functions further consequently my be split in a control part, PDCP-C residing in the CU-CP and a user plane part, PDCP-U residing in the CU-UP.

CU-CP and CU-UP may communicate to each other over an interface being referred to as E1 interface. The gNB further has a control plane protocol interface NG-AP and a user plane protocol interface NG-UP to a 5G core network.

SUMMARY

It is an object of embodiments of the invention to provide a handling (or managing) of UE context within a disaggregated radio access node.

This object is achieved by the independent claims. Advantageous embodiments are described in the dependent claims and by the following description.

Embodiments of the invention propose a method for the handling of the UE context within a gNB deployed in a disaggregated manner as a gNB-CU and a gNB-DU.

An embodiment refers to a method performed by a radio network node or gNB, wherein the gNB comprises a central unit, CU, and a distributed unit, DU, comprising:
  obtaining one or more criteria for determining a preferable location for a UE context controller in the gNB, the UE context controller managing a connection between a UE and the gNB; and
  determining, based on the one or more criteria, whether the UE context controller shall be located in the CU and/or in the DU.

An embodiment refers to a radio network node, gNB, comprising a processor causing the radio access node to carry out the steps of:
  obtaining one or more criteria for determining a preferable location of a UE context controller in the radio access network node, the UE context controller is managing a connection between a UE and the radio access network node; and
  determining, based on the one or more criteria, whether the UE context controller shall be located in the CU and/or in the DU.

In an embodiment, the (gNB) UE context controller may be regarded as a set of functions that controls a UE connection to the gNB by means of a UE context. In other words, the managing (e.g. establishing, releasing, maintaining) the UE context may be regarded as being performed by the UE context controller. The UE context may be regarded as a block of (control) information associated to an active (or connected) UE. The block of information contains the necessary information required to maintain the radio access network, RAN, services towards the UE.

Communication between the CU and the DU may be performed by means of an interface called F1 interface.

By the very nature of a split deployment there may be inserted a delay in the communication of the UE with the gNB. On the other hand, the split allows for a flexible management of access functions with respect to the UE. It allows further to provide a plurality of DUs to be as close as possible to the UE. Embodiments allow the gNB a possibility to have overall control of the UE mobility over multiple DUs; such control may be performed by the CU. The CU may perform controlling based on one or plurality of criteria, e.g. to guarantee a maximum latency, or to ensure a minimum signalling. This may be especially important in the case of dense deployment with small DU (for example in an indoor deployment), to minimize signaling.

Determining the preferable location of the UE context (controller) may be performed in an adaptive way, so that a transfer of the UE context (controller) form the CU to the DU is performed such that the one or the plurality of criteria (e.g. a maximum latency and a minimum signalling overhead) are met at any time.

In other words, embodiments described herein allows for locating the UE context in a flexible and optimal way at the DU or at the CU site according to chosen criteria that may be derived from supporting monitoring algorithms.

As an advantage of embodiments discussed here, the existing functions of the various Uu protocol layers are maintained unchanged compared to a non-split gNB.

Embodiments allow for similar solution for LTE (long term evolution) in case a similar split is adopted for LTE systems.

BRIEF DESCRIPTION

Figure 8:
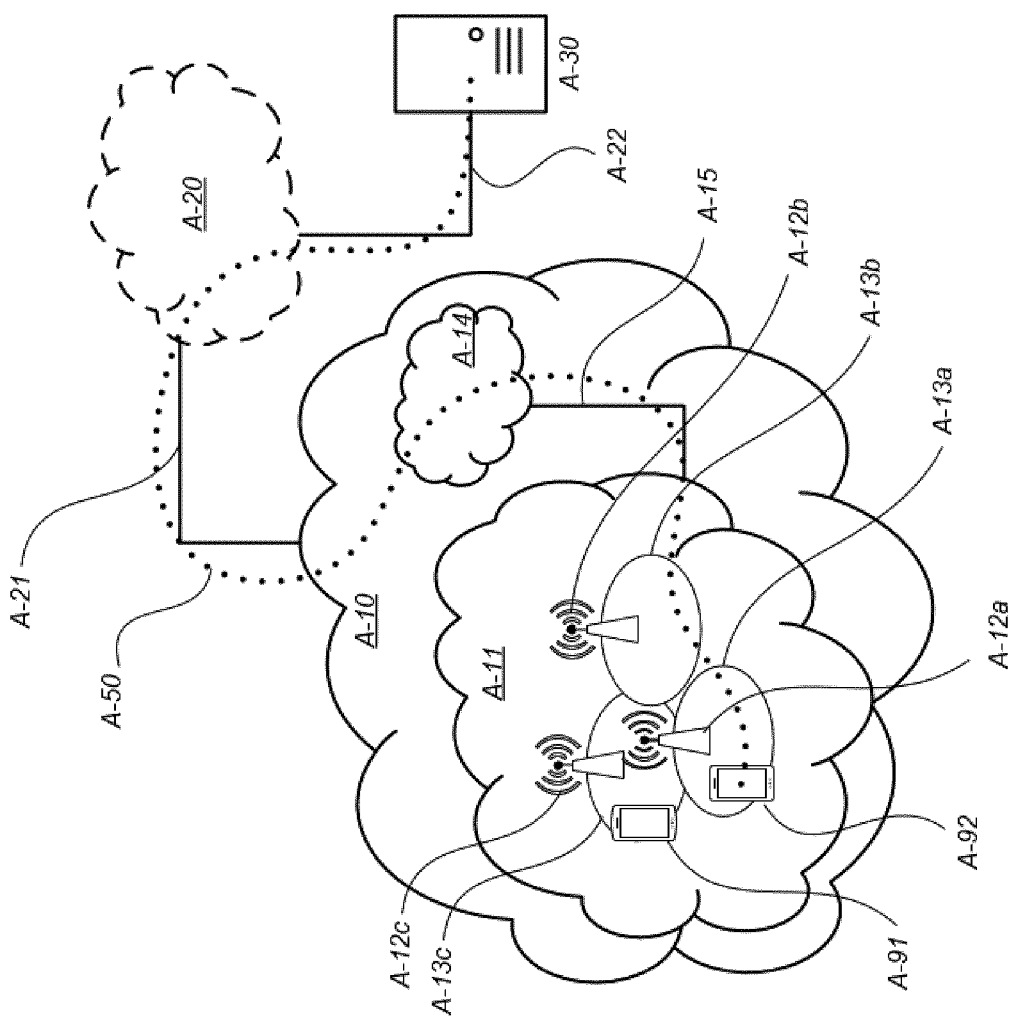

FIG. 8 schematically illustrates a telecommunication network connected via an intermediate network to a host computer.

Figure 9:
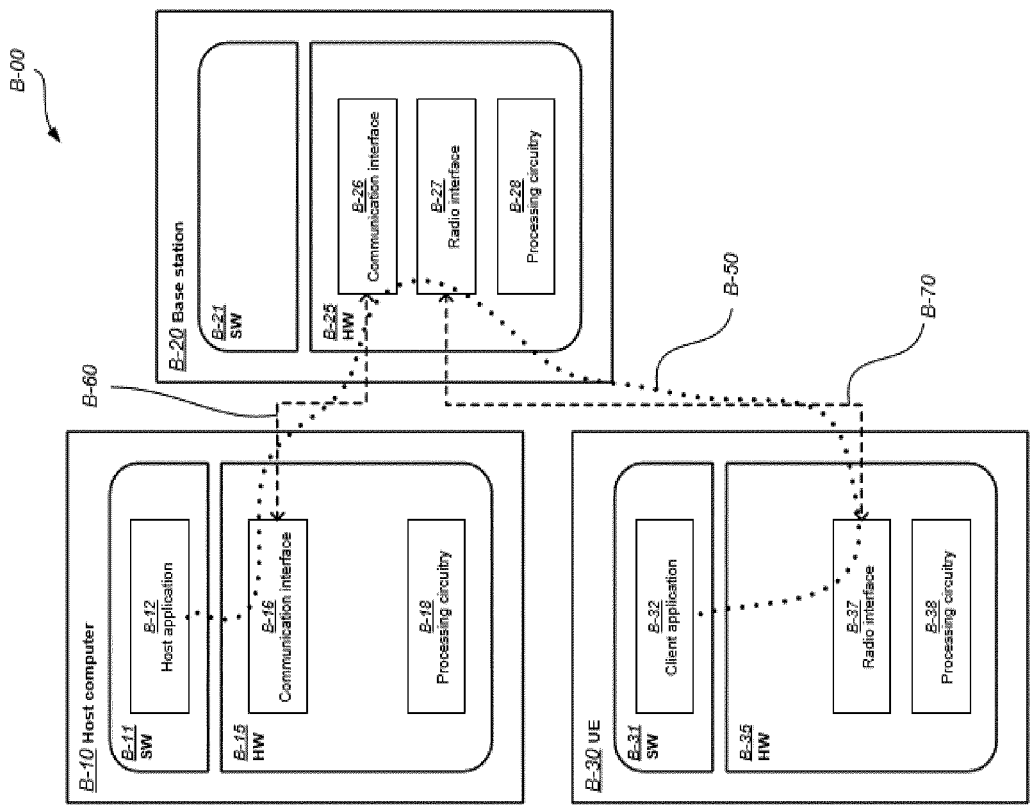

FIG. 9 is a generalized block diagram of a host computer communicating via a base station with a user equipment over a partially wireless connection.

FIGS. 10 to 13 are flowcharts illustrating methods implemented in a communication system including a host computer, a base station and a user equipment.

DETAILED DESCRIPTION

Some of the embodiments contemplated herein will now be described more fully hereinafter with reference to the accompanying drawings.

As discussed above, the term gNB is being used within the frame of 5G standardization. The gNB can be realized as a group of radio network nodes deployed in a disaggregated manner as a central unit, (gNB-)CU and a distributed unit, (gNB-)DU. It shall be noted that the invention is not limited to (5G) gNB, but it may be implemented in any other radio access technology, such as LTE.

Figure 1:
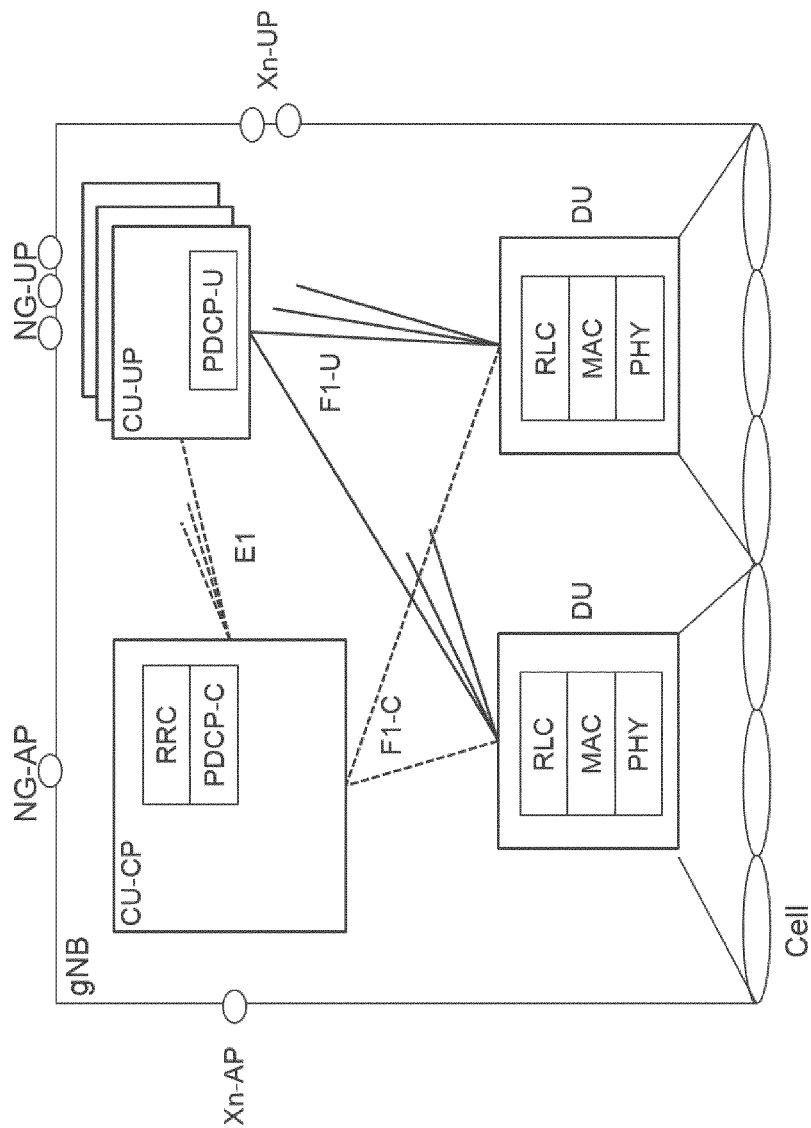
FIG. 1 illustrates a disaggregated radio access node, gNB, according to 3GPP.
Figure 2:
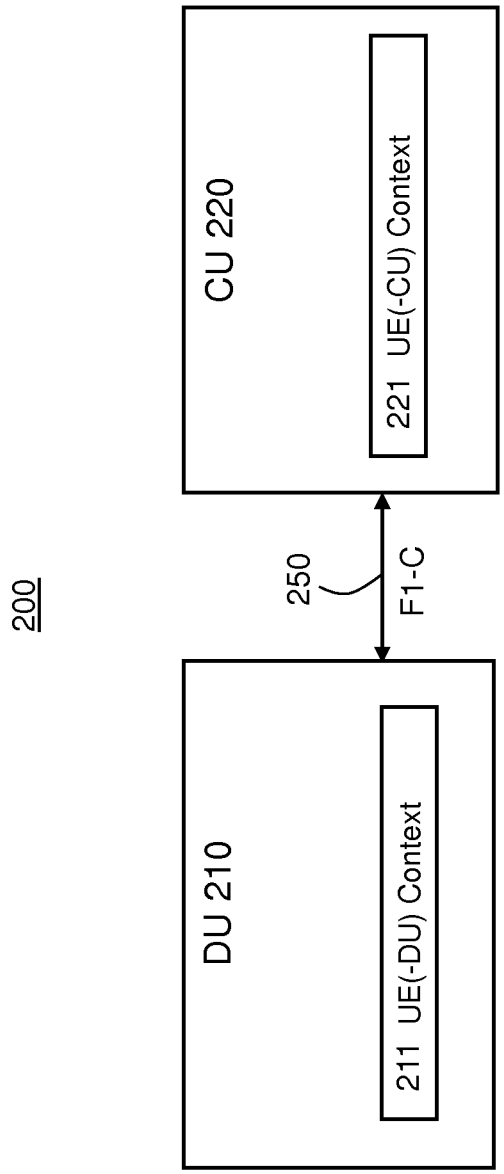
FIG. 2 illustrates an embodiment wherein the gNB is split into a central unit, CU and distributed unit DU, wherein a location of UE context information depends on certain criteria.

FIG. 2 illustrates an embodiment wherein the gNB 200 is split into a central unit, CU 220 and distributed unit 210. A (gNB) UE-CU context 221 resides (is located) at the CU 220, and a (gNB UE-DU context 211 (UE-CU cloud context 221) resides (is located) at the DU 210. The F1-C interface 250 connects the DU 210 and the CU 220.

According to embodiments, the UE context (controller) may exist both in the CU and in the DU; its location at any given time may be chosen as a function of one or more optimization criteria, for example criteria related to latency, signalling overhead and signal load.

In the following transferring/locating the UE context in a certain radio access node (CU, DU etc.) may be regarded as to transfer/establish a responsibility for controlling the UE connection by means of the UE context. In other words, transferring/locating the UE context may be regarded as transferring/locating the UE context controller to/at such node.

For example, an actual location of the UE context (controller) may be chosen to achieve a lowest latency, a minimum signalling, and/or DU or CU load optimization.

Therewith, at any given time during lifetime of a UE connection, the UE context (controller) can be chosen to reside in the CU, the DU or in both the CU and DU such that performance is optimized and/or inter-node signalling is minimized. For example, for a UE that is not moving outside the coverage area of a given gNB-DU, the UE context (and hence the anchoring point for radio interface communication) can be chosen to reside locally in the DU and closer to the antenna, otherwise (if the UE performs inter-DU mobility, or if inter-DU mobility becomes likely or necessary), the UE handling (the UE context or part of the UE context) may be moved to the CU in time, so that the necessary mobility actions with respect to the UE can be taken (performed by the CU). Assuming a fairly large coverage area for the DU (macro deployment) and/or UEs with relative low mobility, there is an advantage in avoiding an extra latency burden represented by an extra F1 leg (thus trying to keep the UE handling with the DU). This may be especially beneficial in cases where the transport network introduces non-negligible control plane delays over the F1 interface.

In the following further embodiments are listed:
1. The UE context, RRC termination and related UE handling functionality is allowed to reside in both gNB-DU and gNB-CU, wherein at any given time, either the CU or the DU are in charge of the UE connection. Optionally, the responsibility may be divided such that the gNB-DU may (without asking for permission) initiate a subset of RRC procedures and may inform the gNB-CU (and update the context in the gNB-CU) after RRC procedure completion.
2. Algorithms in the gNB-CU and the gNB-DU enable to choose an optimal location of the active UE context handler, by monitoring when the UE context handling responsibility shall be moved from CU to DU and vice versa. The responsibility may also be divided (split) to both the DU and CU. The DU may execute some RRC procedures locally towards the UE and inform the CU after completion of the procedures.
3. The F1-C interface supports the signalling needed to trigger a relocation of the UE context between CU and DU.
4. In case the CU is deployed in a separate CU-CP and CU-UP, there is the support over the F1-C to relocate the CU-UP termination of the E1 interface without changing the CU-CP. It may be possible to have two E1 UE connections in parallel from the CU-UP to the CU-CP and DU respectively; in that case the CU-UP may react to commands from either of them.

In the following the concept of divided/duplicated UE-CU context responsibility is being described in more detail.

Figure 3:
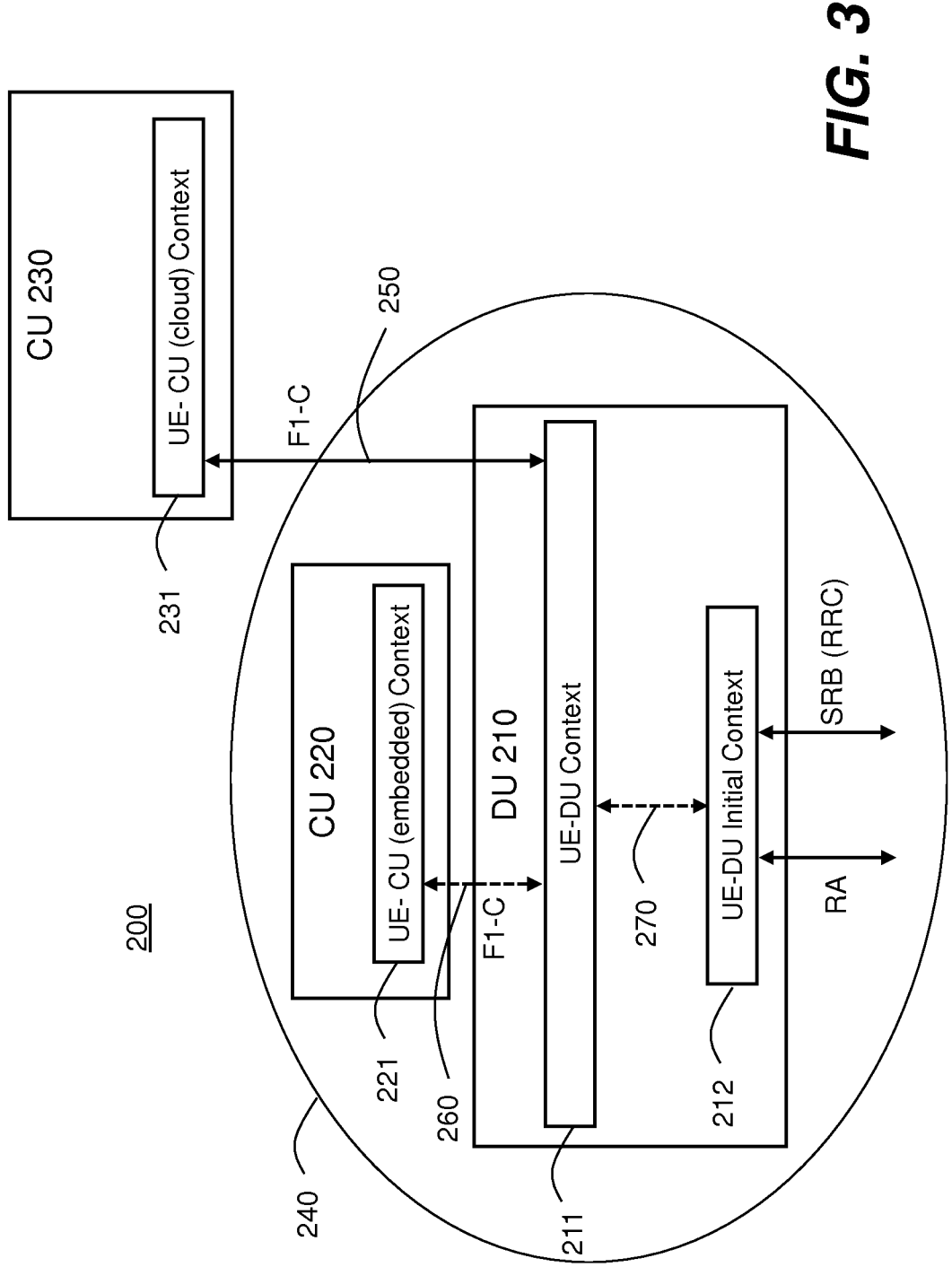
FIG. 3 illustrates another embodiment wherein the CU of FIG. 2 is further split into an embedded CU and into a cloud CU.

FIG. 3 illustrates an embodiment wherein the CU 220 of FIG. 2 is split into a remote or cloud CU part, cloud-CU 230 and an embedded CU part, embedded CU 220. The UE-CU context (the UE context located in the CU) may reside as a cloud-based alternative at the CU site (UE-CU cloud context 231) and as an embedded alternative (UE-CU embedded context 221). The embedded CU 220 may be collocated in an embedded node 240 with (one of) the DU(s) in the gNB 200, e.g. DU 210 of FIG. 2, wherein UE-DU Context 211 and UE-DU initial context 212 may be located. The UE-DU initial context 212 may be associated to random access RA communication and to Signalling Radio Bearer, SRB, establishment (as part of the RRC protocol handling) with respect to the UE.

It may be noted that while it may be realistic to expect that a local CU would be embedded with the DU 210, while a more centrally based CU would be virtualized, the embodiment of FIG. 3 may be realized regardless of any virtualization support.

When the UE-CU (embedded) context 221 is active in the embedded CU 220, it may have full responsibility for handling also the RRC communication with the UE, e.g. including measurements. On the other hand, there may be a coordination between the cloud CU 230 and the embedded CU 220, so that when certain conditions are met, the UE-CU (cloud) context 230 can get active (again) at the cloud CU 230, for example to support mobility involving radio resources that are not under the responsibility of the current DU 210.

A decision to select which one of the UE-CU embedded context 221 and the UE-CU cloud context 231 is to be active (in operating the context) may depend on conditions such as an operator's choice and/or a specific deployment. Such conditions may comprise:

a degree of mobility of a UE (how mobile the UE is);
expected radio conditions;
latency requirements; and
a size and/or a number of cells controlled by the DU.

As an example, with respect to latency, ultra-reliable low latency communication as foreseen in 5G, URLLC, may probably require the UE-CU context to be co-located with Uu lower layers.

As another example, lager cells (large cell clusters) and/or a higher number of cells controlled by the same DU may not require frequent inter-DU mobility.

In the following, a description is given about how such context relocation/duplication may be supported over the F1-C and E1.

An exemplary first signalling support for the F1-C interface 250 concerns a transfer/duplication of the CU-UE context between current CU-CP and DU site (so that the embedded CU can be created).

This may include the full UE-CU context information and establish a local/embedded UE CU context at the DU site (at an embedded CU collocated with the DU), including connecting the local context with the relevant external interface terminations located at the cloud CU (Xn, NG-C).

This may further include the necessary information about the CU-UP, so that a duplicated E1 interface can be established towards the DU site.

The transfer may also include information about activation times, and a configuration of necessary measurements and criteria to support a subsequent transfer of the CU-UE context back to the Cloud-CU.

An exemplary second signalling support for the F1-C interface concerns a transfer of the CU-UE context responsibility back to the cloud CU (e.g. triggered upon given conditions).

The conditions for transferring back the responsibility for UE-CU context to the cloud-CU may be monitored by the cloud CU with support of the embedded CU or they may be monitored directly at the DU site, resulting in either a 'context pull' from the cloud-CU or a 'context push' from the embedded CU/DU.

An exemplary third signalling support for the F1-C interface concerns an ability of creating a duplicate E1 instance between the CU-UP and the DU site/Embedded-CU.

In following it will be illustrated how above principles and techniques of the present disclosure may result in example signaling interactions over F1-C and E1 interfaces.

Figure 4:
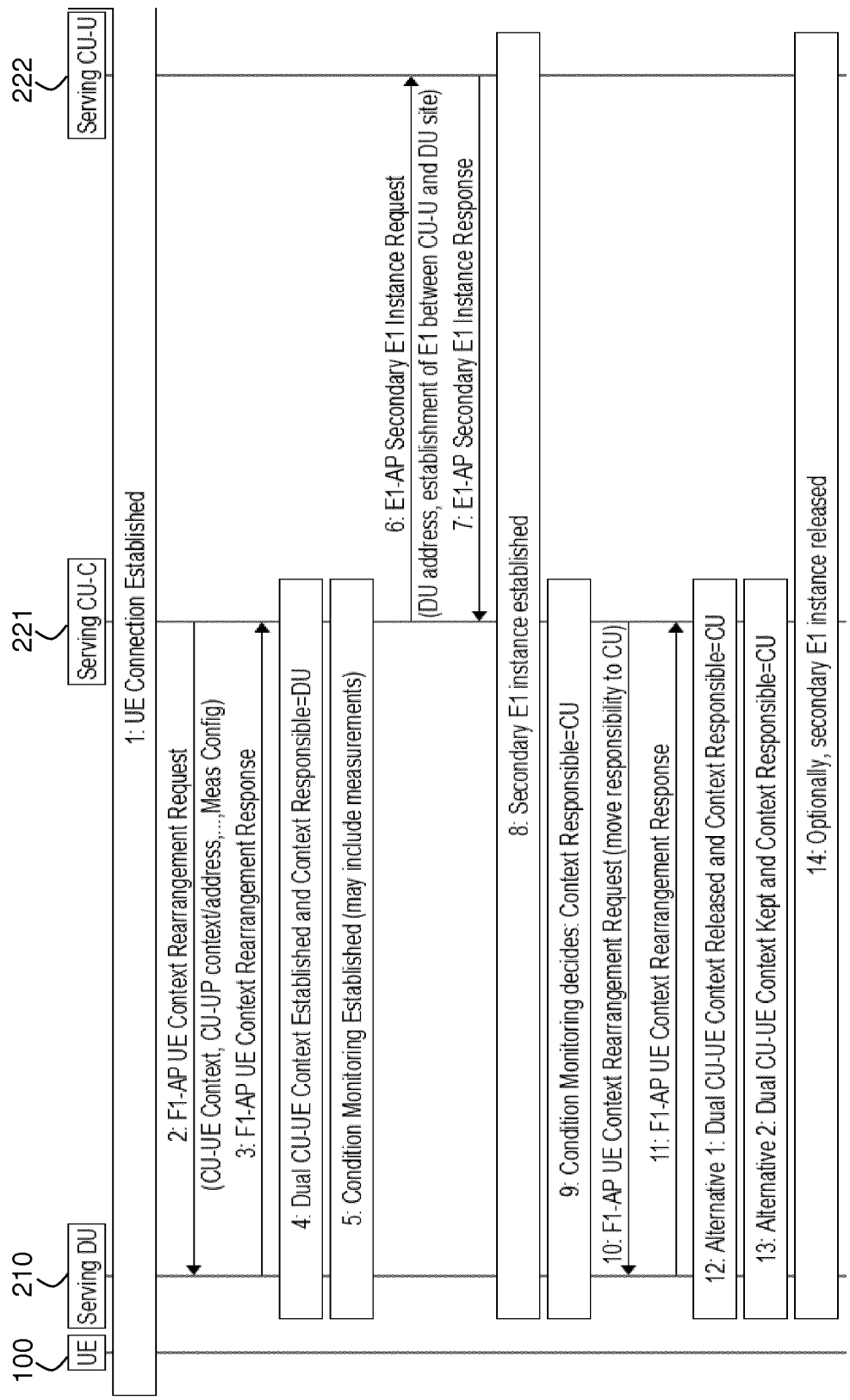
FIG. 4 is a flow chart of an exemplary method performed in an gNB, in accordance with certain embodiments.

Thereto FIG. 4 shows an example call flow supporting a UE context rearrangement between CU site and DU site.

By way of example shows a UE 100 that is served by a radio access network node gNB 200 as of FIG. 2, the gNB 200 comprising the DU 210 and the CU 220, wherein the CU 220 is split into a CU control part CU-C (or CU-CP) 221 and a CU user part CU-U (or CU-UP) 222.
comprising a (serving) DU 320, a (serving) CU split into a (serving) CU-CP 330 and a (serving) CU-UP 340, wherein the CU-UP communicates with the DU 320 by means of a F1 control plane component, F1 C, in the following also being referred to as F1-application protocol, F1-AP, and wherein the CU-CP 330 and the CU-UP 340 communicate by means of an E1 control plane component, in the following also being referred to as E1-application protocol E1-AP.

In a first step 1, a UE connection is established between the UE 100 and the radio access network.

In a second step 2, the CU-C 221 transmits a (F1-AP) UE Context Rearrangement Request to the DU 210.

In a third step 3, the DU 210 transmits a (F1-AP) UE Context Rearrangement Response to the CU-C 221.

In a fourth step 4, a Dual (CU-)UE Context is established (with the DU being the context responsible).

In a fifth step 5, a condition monitoring is established, that may include measurements.

In an optional sixth step 6, the CU-C 221 transmits a (E1-AP) secondary instance request to the CU-U 222.

In an optional seventh step 7, the CU-U transmits a (E1-AP) secondary instance response to the CU-C 221.

In an optional eight step 8, the secondary E1 instance is established.

In a ninth step 9, based on a condition monitoring, it is decided to move the context responsibility to the CU (CU-C 221).

In a tenth step 10, the CU-C 221 transmits a (F1-AP) UE context rearrangement request (to move the responsibility to the CU) to the DU 210.

In an eleventh step 11, the DU 210 transmits a (F1-AP) UE context rearrangement response to the CU-C 221.

In a twelfth step 12, the Dual (CU-)UE context is released, and the CU assumes context responsibility.

Alternatively to step 12, in a thirteenth step 13, the Dual CU-CE context is kept, and the CU assumes context responsibility.

In an optional step 14, the secondary E1 instance is released.

Figure 5:
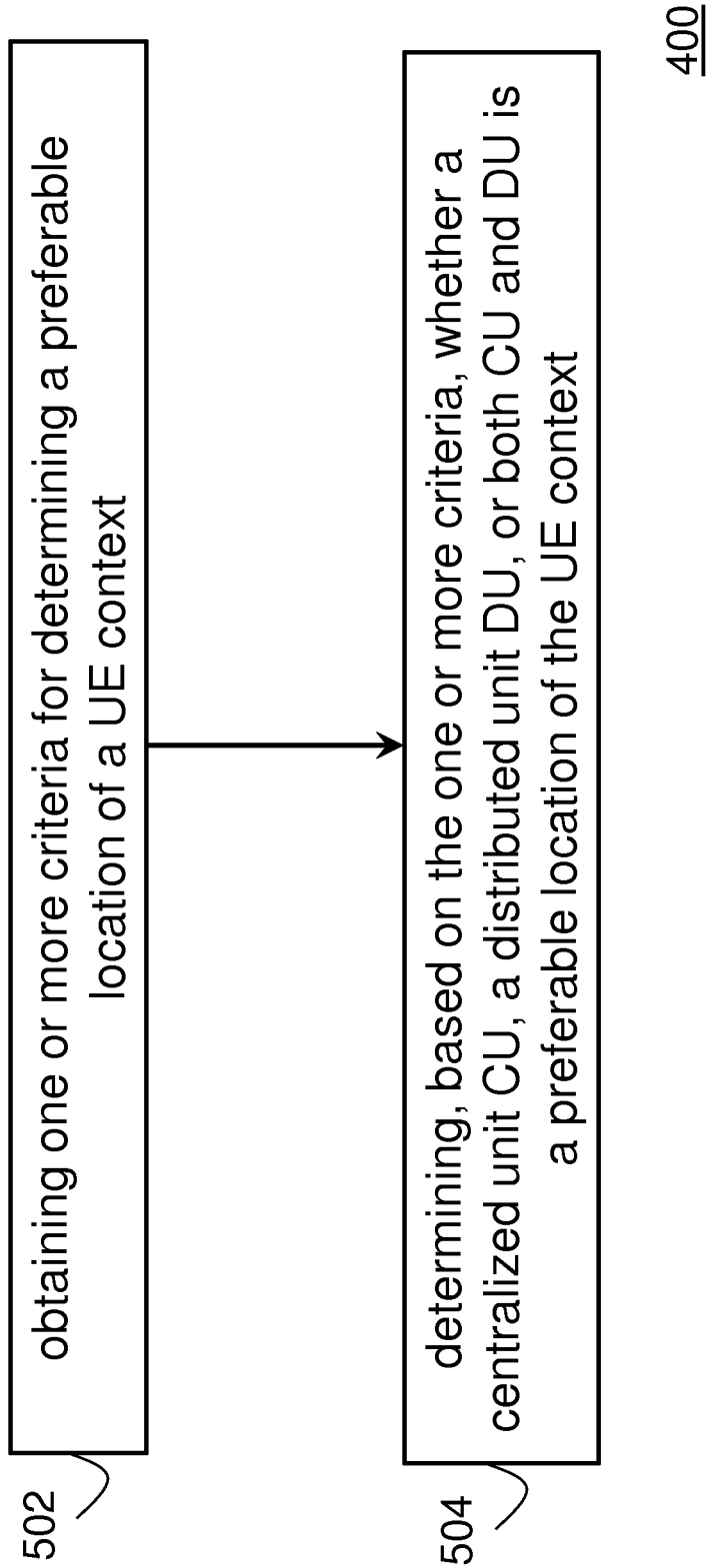
FIG. 5 is flow chart of a method to determine a location of UE context information depending on certain criteria.

FIG. 5 illustrates a flow diagram of an exemplary method 500 performed by a radio network node serving as a distributed unit or central unit running a UE-DU and/or UE-CU context according to the present disclosure. For instance, method 500 may include, at block 502, obtaining one or more factors (such as those listed above) for determining a preferable location (preferable meaning single or multiple-instance location(s) that are selected based on the one or more factors) of a UE context controller in a radio access network. The UE context controller can be configured to manage a connection between a UE and the radio access network. In addition, at block 504, method 500 may include determining, based on the one or more conditions or factors, whether a centralized unit CU, a distributed unit DU, or both units constitutes the preferable location. This preferable location can change based on the one or more factors over time in a dynamic fashion. In addition, though not explicitly shown in FIG. 5, method 500 may include one or more additional or alternative embodiments, such as those described above.

Figure 6:
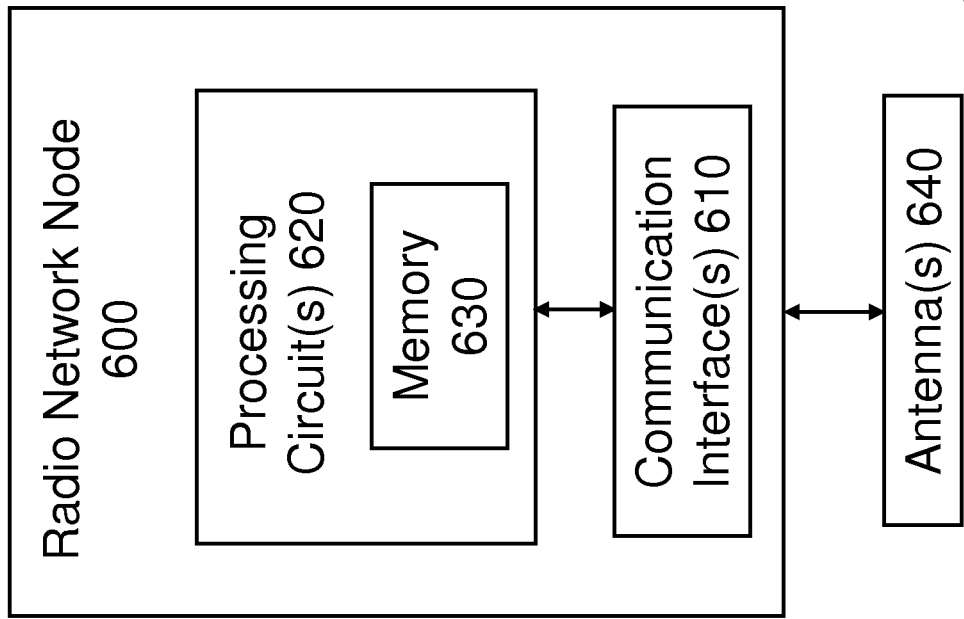
FIG. 6 is a block diagram illustrating exemplary physical blocks of a gNB.

FIG. 6 illustrates an example radio network node 600 according to one or more embodiments. The radio network node is configured to implement processing to perform the aspects described above.

In embodiments, the radio network node comprises one or more processing circuits 620 configured to implement processing such as by implementing functional means or units for performing one or more aspects described above. In one embodiment, for example, the processing circuit(s) 620 implements functional means or units as respective circuits. The circuits in this regard may comprise circuits dedicated to performing certain functional processing and/or one or more microprocessors in conjunction with memory 630. In embodiments that employ memory 630, which may comprise one or several types of memory such as read-only memory (ROM), random-access memory, cache memory, flash memory devices, optical storage devices, etc., the memory 630 stores program code that, when executed by the one or more for carrying out one or more microprocessors, carries out the techniques described herein.

In embodiments, the radio network node also comprises one or more communication interfaces 610. The one or more communication interfaces 610 include various components (e.g., antennas 640) for sending and receiving data and control signals. More particularly, the interface(s) 610 include a transmitter that is configured to use known signal processing techniques, typically according to one or more standards, and is configured to condition a signal for transmission (e.g., over the air via one or more antennas 640). Similarly, the interface(s) include a receiver that is configured to convert signals received (e.g., via the antenna(s) 640) into digital samples for processing by the one or more processing circuits. The transmitter and/or receiver may also include one or more antennas 640. By utilizing the communication interface(s) 610 and/or antenna(s) 640, the radio network node is able to communicate with other devices to transmit QoS data flows as well as manage the mapping of these flows to radio bearers, remap the flows to different bearers, and/or remove the flows entirely.

Figure 7:
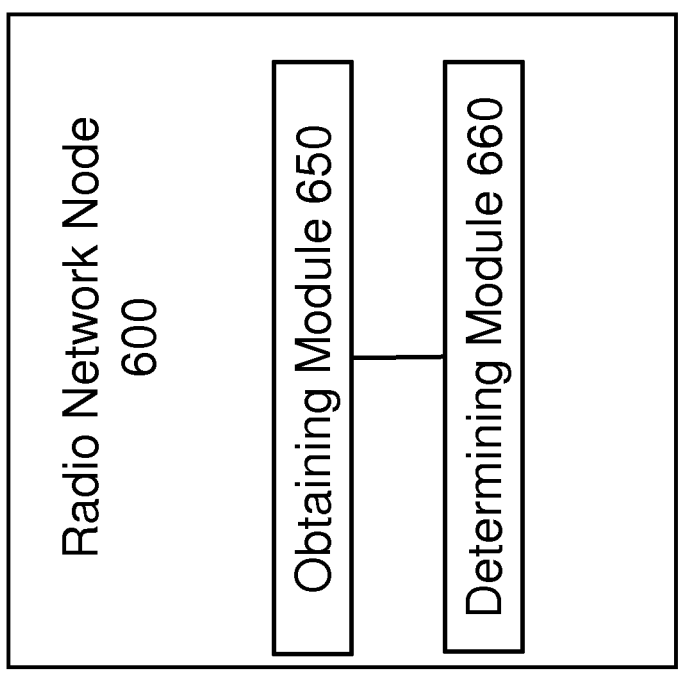
FIG. 7 is a block diagram illustrating exemplary functional blocks of a gNB.

FIG. 7 illustrates a functional block diagram of the exemplary network node 600. The functional blocks may comprise an obtaining module 650 adapted for obtaining one or more criteria (or factors) for determining a preferable location of a UE context, the UE context controller managing a connection between a UE and the radio access network. The functional blocks may further comprise a determining module 660 adapted for determining, based on the one or more criteria, whether the centralized unit (e.g. CU 220), the distributed unit (e.g. DU 210), or both the CU and DU constitutes a preferable location.

In an embodiment, the radio access network comprises a central unit, CU 220, and a distributed unit, DU 210, wherein one of the CU or the DU performs:
  obtaining one or more criteria for determining a preferable location of a UE context in the radio access network node, wherein the UE context is used to control a connection between a UE and the radio access network node 200; and
  determining, based on the one or more criteria, whether the UE context to control the connection shall be located in the CU and/or in the DU.

The one or more criteria may be related to at least one of: a latency of the UE communication, a signalling overhead with respect to user signalling and/or a signal load in one of the CU 220 and the DU 210.

Determining a preferable location of the UE context may be performed based on one or a plurality of the following criteria: a lowest latency, a maximum allowable/acceptable latency, a minimum signalling a minimum inter-node signalling, and/or DU or CU load optimization.

In an embodiment, a criterion may be that the UE 100 is not moving outside a coverage area of the DU 210, and wherein if this criterion is fulfilled, the UE context is chosen to reside in the DU 210.

In an embodiment, a criterion is that the UE performs an inter-DU mobility and/or that inter-DU mobility becomes likely or necessary, and wherein if this criterion is fulfilled, the UE context is chosen to reside in the CU 220.

In an embodiment, a criterion is maximum acceptable latency with respect to UE communications, and wherein the UE context is chosen to reside in the DU 210, if the maximum accepted latency cannot be fulfilled by the CU 220 being UE context responsible.

In an embodiment, one of the CU 210 and the DU 210 performs monitoring if the one or the plurality of conditions are fulfilled and initiating the transfer of the UE context from the CU 220 to the DU 210 or vice versa upon fulfilment of the one or the plurality of conditions.

In an embodiment, the CU performs the following steps:
  transmitting a UE Context Rearrangement Request to the DU 210;
  receiving from the DU 210 a UE Context Rearrangement Response to the CU 221;
  establishing a UE context in both the CU and the DU, with the DU being the context responsible;
  establishing a condition monitoring;
  deciding, based on a condition monitoring, to move the context responsibility to the CU 221;
  transmitting to the DU 210 a UE context rearrangement request to move the responsibility to the CU;
  receiving from the DU 210 a UE context rearrangement response to the CU 221; and
  CU assuming UE context responsibility.

In an embodiment, the Dual UE context (with respect to the DU) is released, after the CU assumes the UE context responsibility. Alternatively, the Dual CU-CE context is kept, after the CU assumes the UE context responsibility.

Those skilled in the art will also appreciate that embodiments herein further include corresponding computer programs. A computer program comprises instructions which, when executed on at least one processor of a network node, cause the device or devices to carry out any of the respective processing described above. Furthermore, the processing or functionality may be considered as being performed by a single instance or device or may be divided across a plurality of instances that may be present in a given wireless system such that together the device instances perform all disclosed functionality.

Embodiments further include a carrier containing such a computer program. This carrier may comprise one of an electronic signal, optical signal, radio signal, or computer readable storage medium. A computer program in this regard may comprise one or more code modules corresponding to the means or units described above.

A network node herein can be any type of network node, e.g., a base station, gNB, eNB, nodeB, or access point that is capable of communicating with another node over radio signals.

A UE is any type device capable of communicating with a radio network node over radio signals, such as, but not limited to, a device capable of performing autonomous wireless communication with one or more other devices, including a machine-to-machine (M2M) device, a machine-type communications (MTC) device, a user equipment (UE) (it should be noted that the UE does not necessarily have a "user" in the sense of an individual person owning and/or operating the device).

A UE may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, and wireless customer-premises equipment (CPE). In the discussion herein, a UE may encompass also equipment configured to transmit and/or receive data without human interaction such as machine-to-machine (M2M) devices, machine-type communication (MTC) devices, and (wireless) sensors.

In the present description, current 3GPP terminology is being preferably used. It is to be noted that 3GPP may change terminology without departing from the current principles.

It is to be noted that although the embodiments described herein focus on the NR radio interface, the same principles may be applicable also to LTE nodes showing a similar (functional) split.

FIG. 8 schematically illustrates a telecommunication network connected via an intermediate network to a host computer. With reference to FIG. 8, in accordance with an embodiment, a communication system includes a telecommunication network A-10, such as a 3GPP-type cellular network, which comprises an access network A-11, such as a radio access network, and a core network A-14. The access network A-11 comprises a plurality of base stations A-12*a*, A-12*b*, A-12*c*, such as NBs, eNBs, gNBs or other types of wireless access points, each defining a corresponding coverage area A-13*a*, A-13*b*, A-13*c*. In an aspect, any of base stations A-12*a*, A-12*b*, A-12*c*, or any other base stations described herein may be considered to be a network node, for instance, if such as network node is described above in the present Application. Each base station A-12*a*, A-12*b*, A-12*c* is connectable to the core network A-14 over a wired or wireless connection A-15. A first user equipment (UE) A-91 located in coverage area A-13*c* is configured to wirelessly connect to, or be paged by, the corresponding base station A-12*c*. A second UE A-92 in coverage area A-13*a* is wirelessly connectable to the corresponding base station A-12*a*. While a plurality of UEs A-91, A-92 are illustrated in this example, the disclosed embodiments are equally applicable to a situation where a sole UE is in the coverage area or where a sole UE is connecting to the corresponding base station A-12. In an aspect, any of these UEs, or any other UE described herein may be considered to be configured to perform the aspects of any UE, user terminal, client device, or mobile device described above in the present Application.

The telecommunication network A-10 is itself connected to a host computer A-30, which may be embodied in the hardware and/or software of a standalone server, a cloud-implemented server, a distributed server or as processing resources in a server farm. The host computer A-30 may be under the ownership or control of a service provider, may be operated by the service provider or on behalf of the service provider. The connections A-21, A-22 between the telecommunication network A-10 and the host computer A-30 may extend directly from the core network A-14 to the host computer A-30 or may go via an optional intermediate network A-20. The intermediate network A-20 may be one of, or a combination of more than one of, a public, private or hosted network; the intermediate network A-20, if any, may be a backbone network or the Internet; in particular, the intermediate network A-20 may comprise two or more sub-networks (not shown).

The communication system of FIG. 8 as a whole enables connectivity between one of the connected UEs A-91, A-92 and the host computer A-30. The connectivity may be described as an over-the-top (OTT) connection A-50. The host computer A-30 and the connected UEs A-91, A-92 are configured to communicate data and/or signaling via the OTT connection A-50, using the access network A-11, the core network A-14, any intermediate network A-20 and possible further infrastructure (not shown) as intermediaries. The OTT connection A-50 may be transparent in the sense that the participating communication devices through which the OTT connection A-50 passes are unaware of routing of uplink and downlink communications. For example, a base station A-12 may not or need not be informed about the past routing of an incoming downlink communication with data originating from a host computer A-30 to be forwarded (e.g., handed over) to a connected UE A-91. Similarly, the base station A-12 need not be aware of the future routing of an outgoing uplink communication originating from the UE A-91 towards the host computer A-30.

Example implementations, in accordance with an embodiment, of the UE, base station and host computer discussed in the preceding paragraphs will now be described with reference to FIG. 9. FIG. 9 is a generalized block Diagram of a host computer communicating via a base station with a user equipment over a partially wireless connection.

With reference to FIG. 9, in a communication system B-00, a host computer B-10 comprises hardware B-15 including a communication interface B-16 configured to set up and maintain a wired or wireless connection with an interface of a different communication device of the communication system B-00. The host computer B-10 further comprises processing circuitry B-18, which may have storage and/or processing capabilities. In particular, the processing circuitry B-18 may comprise one or more programmable processors, application-specific integrated circuits, field programmable gate arrays or combinations of these (not shown) adapted to execute instructions. The host computer B-10 further comprises software B-11, which is stored in or accessible by the host computer B-10 and executable by the processing circuitry B-18. The software B-11 includes a host application B-12. The host application B-12 may be operable to provide a service to a remote user, such as a UE B-30 connecting via an OTT connection B-50 terminating at the UE B-30 and the host computer B-10. In providing the service to the remote user, the host application B-12 may provide user data which is transmitted using the OTT connection B-50.

The communication system B-00 further includes a base station B-20 provided in a telecommunication system and comprising hardware B-25 enabling it to communicate with the host computer B-10 and with the UE B-30. The hardware B-25 may include a communication interface B-26 for setting up and maintaining a wired or wireless connection with an interface of a different communication device of the communication system B-00, as well as a radio interface B-27 for setting up and maintaining at least a wireless connection B-70 with a UE B-30 located in a coverage area (not shown in FIG. 9) served by the base station B-20.

The communication interface B-26 may be configured to facilitate a connection B-60 to the host computer B-10. The connection B-60 may be direct or it may pass through a core network (not shown in FIG. 9) of the telecommunication system and/or through one or more intermediate networks outside the telecommunication system. In the embodiment shown, the hardware B-25 of the base station B-20 further includes processing circuitry B-28, which may comprise one or more programmable processors, application-specific integrated circuits, field programmable gate arrays or combinations of these (not shown) adapted to execute instructions. The base station B-20 further has software B-21 stored internally or accessible via an external connection.

The communication system B-00 further includes the UE B-30, which has already been referred to above. Its hardware B-35 may include a radio interface B-37 configured to set up and maintain a wireless connection B-70 with a base station serving a coverage area in which the UE B-30 is currently located. The hardware B-35 of the UE B-30 further includes processing circuitry B-38, which may comprise one or more programmable processors, application-specific integrated circuits, field programmable gate arrays or combinations of these (not shown) adapted to execute instructions. The UE B-30 further comprises software B-31, which is stored in or accessible by the UE B-30 and executable by the processing circuitry B-38.

The software B-31 includes a client application B-32. The client application B-32 may be operable to provide a service to a human or non-human user via the UE B-30, with the support of the host computer B-10. In the host computer B-10, an executing host application B-12 may communicate with the executing client application B-32 via the OTT connection B-50 terminating at the UE B-30 and the host computer B-10. In providing the service to the user, the client application B-32 may receive request data from the host application B-12 and provide user data in response to the request data. The OTT connection B-50 may transfer both the request data and the user data. The client application B-32 may interact with the user to generate the user data that it provides.

It is noted that the host computer B-10, base station B-20 and UE B-30 illustrated in FIG. 9 may be identical to the host computer A-30, one of the base stations A-12a, A-12b, A-12c and one of the UEs A-91, A-92 of FIG. 8, respectively. This is to say, the inner workings of these entities may be as shown in FIG. 9 and independently, the surrounding network topology may be that of FIG. 8.

In FIG. 9, the OTT connection B-50 has been drawn abstractly to illustrate the communication between the host computer B-10 and the use equipment B-30 via the base station B-20, without explicit reference to any intermediary devices and the precise routing of messages via these devices. Network infrastructure may determine the routing, which it may be configured to hide from the UE B-30 or from the service provider operating the host computer B-10, or both. While the OTT connection B-50 is active, the network infrastructure may further take decisions by which it dynamically changes the routing (e.g., on the basis of load balancing consideration or reconfiguration of the network).

The wireless connection B-70 between the UE B-30 and the base station B-20 is in accordance with the teachings of the embodiments described throughout this disclosure. One or more of the various embodiments improve the performance of OTT services provided to the UE B-30 using the OTT connection B-50, in which the wireless connection B-70 forms the last segment. More precisely, the teachings of these embodiments can improve one or more of data rate, latency, and/or power consumption associated with one or more devices and/or communications of/performed in communication system B-00, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection B-50 between the host computer B-10 and UE B-30, in response to variations in the measurement results. The measurement procedure and/or the network functionality for reconfiguring the OTT connection B-50 may be implemented in the software B-11 of the host computer B-10 or in the software B-31 of the UE B-30, or both.

In embodiments, sensors (not shown) may be deployed in or in association with communication devices through which the OTT connection B-50 passes; the sensors may participate in the measurement procedure by supplying values of the monitored quantities exemplified above, or supplying values of other physical quantities from which software B-11, B-31 may compute or estimate the monitored quantities. The reconfiguring of the OTT connection B-50 may include message format, retransmission settings, preferred routing etc.; the reconfiguring need not affect the base station B-20, and it may be unknown or imperceptible to the base station B-20.

Such procedures and functionalities may be known and practiced in the art. In certain embodiments, measurements may involve proprietary UE signaling facilitating the host computer's B-10 measurements of throughput, propagation times, latency and the like. The measurements may be implemented in that the software B-11, B-31 causes messages to be transmitted, in particular empty or 'dummy' messages, using the OTT connection B-50 while it monitors propagation times, errors etc.

FIGS. 10, 11, 12, and 13 are flowcharts illustrating methods implemented in a communication system including a host computer, a base station and a user equipment.

Figure 10:
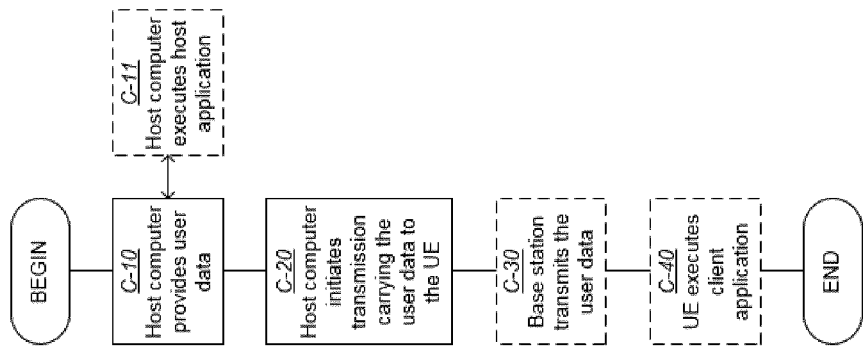

FIG. 10 is a flowchart illustrating a method implemented in a communication system, in accordance with one embodiment.

The communication system includes a host computer, a base station and a UE which may be those described with reference to FIGS. 8 and 9. For simplicity of the present disclosure, only drawing references to FIG. 10 will be included in this section. In a first step C-10 of the method, the host computer provides user data.

In an optional substep C-11 of the first step C-10, the host computer provides the user data by executing a host application. In a second step C-20, the host computer initiates a transmission carrying the user data to the UE.

In an optional third step C-30, the base station transmits to the UE the user data which was carried in the transmission that the host computer initiated, in accordance with the teachings of the embodiments described throughout this disclosure. In an optional fourth step C-40, the UE executes a client application associated with the host application executed by the host computer.

Figure 11:
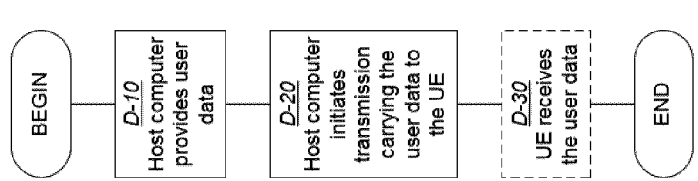

FIG. 11 is a flowchart illustrating a method implemented in a communication system, in accordance with one embodiment.

The communication system includes a host computer, a base station and a UE which may be those described with reference to FIGS. 8 and 9. For simplicity of the present disclosure, only drawing references to FIG. 11 will be included in this section. In a first step D-10 of the method, the host computer provides user data.

In an optional substep (not shown) the host computer provides the user data by executing a host application. In a second step D-20, the host computer initiates a transmission carrying the user data to the UE. The transmission may pass via the base station, in accordance with the teachings of the embodiments described throughout this disclosure. In an optional third step D-30, the UE receives the user data carried in the transmission.

Figure 12:
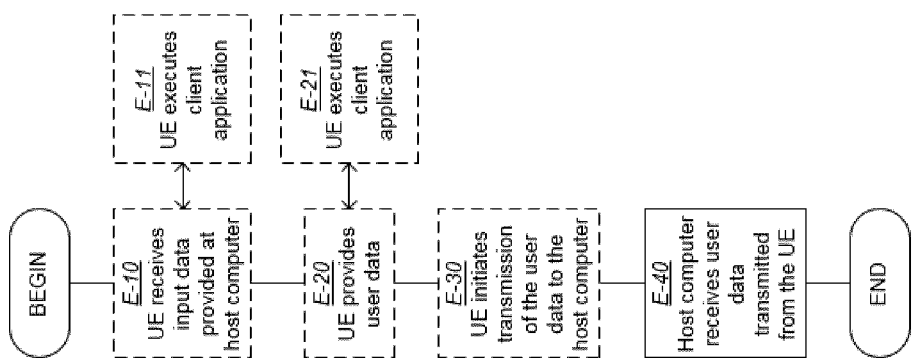

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step E-10 of the method, the UE receives input data provided by the host computer. Additionally or alternatively, in an optional second step E-20, the UE provides user data. In an optional substep E-21 of the second step E-20, the UE provides the user data by executing a client application. In a further optional substep E-11 of the first step E-10, the UE executes a client application which provides the user data in reaction to the received input data provided by the host computer. In providing the user data, the executed client application may further consider user input received from the user. Regardless of the specific manner in which the user data was provided, the UE initiates, in an optional third substep E-30, transmission of the user data to the host computer. In a fourth step E-40 of the method, the host computer receives the user data transmitted from the UE, in accordance with the teachings of the embodiments described throughout this disclosure.

Figure 13:
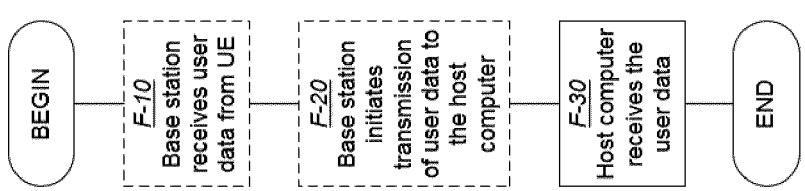

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step F-10 of the method, in accordance with the teachings of the embodiments described throughout this disclosure, the base station receives user data from the UE. In an optional second step F-20, the base station initiates transmission of the received user data to the host computer. In a third step F-30, the host computer receives the user data carried in the transmission initiated by the base station.

Further exemplary embodiments are listed in the following:

A-1. A base station configured to communicate with a user equipment (UE), the base station comprising a radio interface and processing circuitry configured to perform aspects of example embodiments described throughout the present disclosure.

A-2. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform aspects of example embodiments described throughout the present disclosure, including aspects related to forwarding the user data to the UE.

A-3. The communication system of embodiment A-2, further including the base station.

A-4. The communication system of embodiment A-3, further including the UE, wherein the UE is configured to communicate with the base station.

A-5. The communication system of embodiment A-4, wherein:
the processing circuitry of the host computer is configured to execute a host application, thereby providing the user data; and
the UE comprises processing circuitry configured to execute a client application associated with the host application.

A-6. A method implemented in a base station, comprising aspects of example embodiments described throughout the present disclosure, including aspects related to transmitting user data to a UE.

A-7. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station is configured to perform aspects of example embodiments described throughout the present disclosure, included aspects related to transmitting the user data to the UE.

A-8. The method of embodiment A-7, further comprising:
at the base station, transmitting the user data.

A-9. The method of embodiment A-8, wherein the user data is provided at the host computer by executing a host application, the method further comprising:
at the UE, executing a client application associated with the host application.

A-10. A user equipment (UE) configured to communicate with a base station, the UE comprising a radio interface and processing circuitry configured to perform aspects of example embodiments described throughout the present disclosure, including aspects related to receiving user data from the base station.

A-11. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to perform aspects of example embodiments described throughout the present disclosure, including aspects related to the UE receiving the user data from the base station.

A-12. The communication system of embodiment A-11, further including the UE.

A-13. The communication system of embodiment A-12, wherein the cellular network further includes a base station configured to communicate with the UE.

A-14. The communication system of embodiment A-12 or A-13, wherein:
the processing circuitry of the host computer is configured to execute a host application, thereby providing the user data; and the UE's processing circuitry is configured to execute a client application associated with the host application.

A-15. A method implemented in a user equipment (UE), comprising aspects of example embodiments described throughout the present disclosure, including aspects related to the UE receiving user data from a base station.

A-16. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE is configured to perform aspects of example embodiments described throughout the present disclosure, including aspects related to the UE receiving the user data from the base station.

A-17. The method of embodiment A-16, further comprising:
at the UE, receiving the user data from the base station.

A-18. A user equipment (UE) configured to communicate with a base station, the UE comprising a radio interface and processing circuitry configured to perform aspects of example embodiments described throughout the present disclosure, including aspects related to the UE transmitting user data to the base station.

A-19. A communication system including a host computer comprising:
a communication interface configured to receive user data originating from a transmission from a user equipment (UE) to a base station,
wherein the UE comprises a radio interface and processing circuitry, the UE's processing circuitry configured to perform aspects of example embodiments described throughout the present disclosure, including aspects related to the UE transmitting user data to the base station.

A-20. The communication system of embodiment A-19, further including the UE.

A-21. The communication system of embodiment A-20, further including the base station, wherein the base station comprises a radio interface configured to communicate with the UE and a communication interface configured to forward to the host computer the user data carried by a transmission from the UE to the base station.

A-22. The communication system of embodiment A-20 or A-21, wherein:
the processing circuitry of the host computer is configured to execute a host application; and
the UE's processing circuitry is configured to execute a client application associated with the host application, thereby providing the user data.

A-23. The communication system of embodiment A-20 or A-21, wherein:
the processing circuitry of the host computer is configured to execute a host application, thereby providing request data; and
the UE's processing circuitry is configured to execute a client application associated with the host application, thereby providing the user data in response to the request data.

A-24. A method implemented in a user equipment (UE), comprising aspects of example embodiments described throughout the present disclosure, including aspects related to the UE transmitting user data to a base station.

A-25. The method of embodiment A-24, further comprising:
providing user data; and
forwarding the user data to a host computer via the transmission to the base station.

A-26. A method implemented in a communication system including a host computer, a base station and a user equipment (UE), the method comprising:
at the host computer, receiving user data transmitted to the base station from the UE, wherein the UE is configured to perform aspects of example embodiments described throughout the present disclosure, including aspects related to the UE transmitting user data to the base station.

A-27. The method of embodiment A-26, further comprising:
at the UE, providing the user data to the base station.

A-28. The method of embodiment A-27, further comprising:
at the UE, executing a client application, thereby providing the user data to be transmitted; and
at the host computer, executing a host application associated with the client application.

A-29. The method of embodiment A-27, further comprising:
at the UE, executing a client application; and
at the UE, receiving input data to the client application, the input data being provided at the host computer by executing a host application associated with the client application,
wherein the user data to be transmitted is provided by the client application in response to the input data.

A-30. A base station configured to communicate with a user equipment (UE), the base station comprising a radio interface and processing circuitry configured to perform aspects of example embodiments described throughout the present disclosure, including aspects related to the base station receiving user data from the UE.

A-31. A communication system including a host computer comprising a communication interface configured to receive user data originating from a transmission from a user equipment (UE) to a base station, wherein the base station comprises a radio interface and processing circuitry, the base station's processing circuitry configured to perform aspects of example embodiments described throughout the present disclosure, including aspects related to the base station receiving user data from the UE.

A-32. The communication system of embodiment A-31, further including the base station.

A-33. The communication system of embodiment A-32, further including the UE, wherein the UE is configured to communicate with the base station.

A-34. The communication system of embodiment A-33, wherein:
the processing circuitry of the host computer is configured to execute a host application;
the UE is configured to execute a client application associated with the host application, thereby providing the user data to be received by the host computer.

A-35. A method implemented in a base station, comprising perform aspects of example embodiments described throughout the present disclosure, including aspects related to the base station receiving user data from a user equipment (UE).

A-36. A method implemented in a communication system including a host computer, a base station and a user equipment (UE), the method comprising:
at the host computer, receiving, from the base station, user data originating from a transmission which the base station has received from the UE, wherein one or both of the base station and the UE are configured to perform aspects of example embodiments described throughout the present disclosure, including aspects related to the base station receiving user data from the UE and/or aspects related to the UE transmitting user data to the base station.

A-37. The method of embodiment A-36, further comprising: at the base station, receiving the user data from the UE.

A-38. The method of embodiment A-37, further comprising: at the base station, initiating a transmission of the received user data to the host computer.

A-39. A method performed by a radio network node of a radio access network, comprising: obtaining one or more factors for determining a preferable location of a UE context controller in the radio access network, the UE context controller managing a connection between a UE and the radio access network; and determining, based on the one or more factors, whether a centralized unit, a distributed unit, or both constitutes the preferable location.

A-40. The method of A-39, wherein the centralized unit and the distributed unit are co-located at the radio access network.

A-41. The method of A-39, wherein the centralized unit and the distributed unit are not co-located at the radio access network.

A-42. A UE or radio network node, comprising one or more processing circuits and at least one memory, wherein the one or more processing circuits are configured to perform at least one instruction stored on the at least one memory such that the UE, radio access node, or core access node performs the methods of any of the above embodiments.

a-43. A computer-readable medium, storing processor-executable instructions that when executed by a processor, perform the aspects of any of the above embodiments.

Abbreviations

| Abbreviation | Explanation |
| --- | --- |
| CN | Core Network |
| CP | Control Plane |
| EPS | Evolved Packet System |
| gNB | 5G RAN logical node |
| gNB-CU | gNB Central Unit |
| gNB-DU | gNB Distributed Unit |
| MAC | Medium Access Control |
| PDCP | Packet Data Convergence Protocol |
| PHY | Physical Layer |
| RAN | Radio Access Network |
| RLC | Radio Link Control |
| RRC | Radio Resource Control |
| UE | User Equipment |
| UP | User Plane |

The invention claimed is:

1. A method performed by a radio access network node, wherein the radio access network node comprises a central unit (CU) and a distributed unit (DU), the method comprising:
obtaining one or more criteria for determining a preferable location for a UE context controller in the radio access network node, the UE context controller managing a connection between a UE and the radio access network node; and
determining, based on the one or more criteria, whether the UE context controller shall be located in the CU and/or in the DU.

2. The method of claim 1, wherein the one or more criteria are related to a latency of the UE communication, to a signaling overhead with respect to user signaling, and/or to a signal load in one of the CU and the DU.

3. The method of claim 1, wherein the determining a preferable location of the UE context controller is performed based the following criteria: a lowest latency, a minimum signaling, a minimum inter-node signaling, and/or DU or CU load optimization.

4. The method of claim 1:
wherein the one or more criteria comprise that the UE is not moving outside a coverage area of the DU; and
wherein in response to the criterion being fulfilled, the UE context controller is chosen to reside in the DU.

5. The method of claim 1:
wherein the one or more criteria comprises a criterion that the UE performs an inter-DU mobility and/or that inter-DU mobility becomes likely or necessary; and
wherein in response to this criterion being fulfilled, the UE context controller is chosen to reside in the CU.

6. The method of claim 1:
wherein the one or more criteria comprises a maximum accepted latency with respect to UE communications; and
wherein the UE context controller is chosen to reside in the DU if the maximum accepted latency cannot be fulfilled by the CU being UE context responsible.

7. The method of claim 1, wherein one of the CU and the DU performs:
monitoring if the one or a plurality of conditions are fulfilled; and
initiating the transfer of the UE context from the CU to the DU, or vice versa, upon fulfilment of the one or the plurality of conditions.

8. The method of claim 1, further comprising:
the CU transmitting a UE Context Rearrangement Request to the DU;
the DU transmitting a UE Context Rearrangement Response to the CU;
establishing a UE context in both the CU and the DU, with the DU being the context responsible;
establishing a condition monitoring;
deciding, based on a condition monitoring, to move the context controller to the CU;
the CU transmitting, to the DU, a UE context rearrangement request to move the context controlling responsibility to the CU;
the DU transmitting a UE context rearrangement response to the CU; and
the CU assuming UE context controlling responsibility.

9. A radio access network node, wherein the radio access network node has a central unit (CU) and a distributed unit (DU), the radio access network node comprising:
processing circuitry;
memory containing instructions executable by the processing circuitry whereby the radio network node is operative to:
obtain one or more criteria for determining a preferable location of a UE context controller in the radio access network node, the UE context controller managing a connection between a UE and the radio access network node; and
determining, based on the one or more criteria, whether the UE context controller shall be located in the CU and/or in the DU.

10. The radio access network node of claim 9, wherein the one or more criteria are related to a latency of the UE communication, to a signaling overhead with respect to user signaling, and/or to a signal load in one of the CU and the DU.

11. The radio access network node of claim 9, wherein the instructions are such that the radio access network node is operative to determine a preferable location of the UE context controller based on the following criteria: a lowest latency, a minimum signaling a minimum inter-node signaling, and/or DU or CU load optimization.

12. The radio access network node of claim 9:
wherein the one or more criteria comprise a criterion that the UE is not moving outside a coverage area of the DU; and
wherein the instructions are such that the radio access network node is operative to, in response to this criterion being fulfilled, transfer the UE context controller to reside in the DU.

13. The radio access network node of claim 9:
wherein the one or more criteria comprise a criterion that the UE performs an inter-DU mobility and/or that inter-DU mobility becomes likely or necessary; and
wherein the instructions are such that the radio access network node is operative to, in response to this criterion being fulfilled, transfer the UE context controller to reside in the CU.

14. The radio access network node of claim 9:
wherein the one or more criteria comprises a maximum accepted latency with respect to UE communications; and
wherein the instructions are such that the radio access network node is operative to transfer the UE context controller to reside in the DU if the maximum accepted latency cannot be fulfilled by the CU being UE context controlling responsible.

15. The radio access network node of claim 9, wherein one of the CU and a DU performs:
monitoring if the one or a plurality of conditions are fulfilled; and
initiating the transfer of the UE context controller from the CU to the DU or vice versa upon fulfilment of the one or the plurality of conditions.

16. The radio access network node of claim 9, wherein the CU is configured to perform:
transmitting a UE Context Rearrangement Request to the DU;
receiving, from the DU, a UE Context Rearrangement Response;
initiating establishing a UP context in both the CU and the DU with the CU being the context responsible; establishing a condition monitoring;
deciding, based on a condition monitoring, to move the context controlling responsibility to the CU;
transmitting, to the DU, a UE context rearrangement request to move the responsibility to the CU;
receiving, from the DU, a UE context rearrangement response; and
assuming UP context controlling responsibility.

* * * * *

UNITED STATES PATENT AND TRADEMARK OFFICE
CERTIFICATE OF CORRECTION

Page 1 of 2

PATENT NO. : 10,999,743 B2
APPLICATION NO. : 16/619517
DATED : May 4, 2021
INVENTOR(S) : Myhre et al.

It is certified that error appears in the above-identified patent and that said Letters Patent is hereby corrected as shown below:

In the Specification

In Column 1, Line 67, delete "my be" and insert -- may be --, therefor.

In Column 2, Line 67, delete "form" and insert -- from --, therefor.

In Column 3, Line 60, delete "(gNB" and insert -- (gNB) --, therefor.

In Column 6, Line 36, delete "eight" and insert -- eighth --, therefor.

In Column 6, Line 51, delete "step 14" and insert -- fourth step 14 --, therefor.

In Column 8, Line 8, delete "signalling" and insert -- signalling, --, therefor.

In Column 8, Line 23, delete "CU 210" and insert -- CU 220 --, therefor.

In Column 9, Line 1, delete "type device" and insert -- type of device --, therefor.

In Column 9, Line 17, delete "equipped" and insert -- equipment --, therefor.

In Column 11, Line 53, delete "use equipment" and insert -- user equipment --, therefor.

In the Claims

In Column 18, Line 5, in Claim 3, delete "based the" and insert -- based on the --, therefor.

In Column 19, Line 8, in Claim 11, delete "signalling" and insert -- signalling, --, therefor.

In Column 20, Line 19, in Claim 16, delete "a UP" and insert -- a UE --, therefor.

Signed and Sealed this
Eighth Day of March, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,999,743 B2

In Column 20, Line 20, in Claim 16, delete "DU with the CU" and insert -- DU, with the DU --, therefor.

In Column 20, Line 28, in Claim 16, delete "UP" and insert -- UE --, therefor.